US012351308B2

(12) United States Patent
Amerl

(10) Patent No.: US 12,351,308 B2
(45) Date of Patent: Jul. 8, 2025

(54) SEAPLANE FLOAT PROPULSION SYSTEM

(71) Applicant: Zrinko Rudolf Amerl, Chilliwack (CA)

(72) Inventor: Zrinko Rudolf Amerl, Chilliwack (CA)

( * ) Notice: Subject to any disclaimer, the term of this patent is extended or adjusted under 35 U.S.C. 154(b) by 81 days.

(21) Appl. No.: 18/051,118

(22) Filed: Oct. 31, 2022

(65) Prior Publication Data
US 2024/0140603 A1     May 2, 2024

(51) Int. Cl.
*B64C 35/00* (2006.01)
(52) U.S. Cl.
CPC .......... *B64C 35/005* (2013.01); *B64C 35/001* (2013.01)
(58) Field of Classification Search
CPC ............................ B64C 35/001; B64C 35/005
See application file for complete search history.

(56) References Cited

U.S. PATENT DOCUMENTS

| | | | | |
|---|---|---|---|---|
| 2,062,384 A * | 12/1936 | Loren | ...................... | B64C 35/00 244/105 |
| 2009/0121071 A1 * | 5/2009 | Chan | ........................ | B60V 3/06 244/2 |
| 2010/0032522 A1 * | 2/2010 | Zadini | .................... | B63H 25/46 244/105 |
| 2024/0199220 A1 * | 6/2024 | Silina | ...................... | B64U 50/19 |

* cited by examiner

*Primary Examiner* — Richard G Davis
(74) *Attorney, Agent, or Firm* — Orin Del Vecchio

(57) ABSTRACT

A seaplane float propulsion system that is configured to provide maneuverability and directional movement of a seaplane subsequent the engine and propeller being deactivated. The present invention includes a first float member and a second float member wherein the first float member includes a first propulsion assembly mounted therein and the second float member includes a second propulsion assembly mounted therein. The first propulsion assembly and second propulsion assembly are identically constructed. The propulsion assemblies are independently controlled so as to provide both directional and rotational movement of the seaplane to which the present invention is operably installed. The propulsion assemblies include elements that are operable to intake and direct water flow in order to create the desired movement of the seaplane in which the seaplane float propulsion system is installed. The propulsion assemblies include an intake element that provides ideal fluid and aero dynamics.

13 Claims, 4 Drawing Sheets

SEAPLANE FLOAT PROPULSION SYSTEM

FIELD OF THE INVENTION

The present invention relates generally to seaplane propulsion, more specifically but not by way of limitation, a seaplane propulsion system that allows a pilot to maneuver a seaplane with one or two floats, amphibious vessel and the like in the water without the need to utilize the propeller.

BACKGROUND

As is known in the art seaplanes are constructed to land on bodies of water as well as conventional landing strips. The utility of a seaplane is utilized both commercially and recreationally to access areas where conventional landing facilities are not available. The ability to move the seaplane on the water provides a better experience for passengers and decreases the likelihood of accidents and damage during the task of maneuvering the seaplane through areas such as but not limited to marinas. A seaplane pilot must execute many water-based tasks such as but not limited to docking, mooring, and ramping. As seaplanes are propeller driven, the pilot must use the propeller to execute the aforementioned maneuvers. Many times a combination of taxiing and sailing the seaplane is utilized to perform these maneuvers which can be very difficult based on parameters such as but not limited to water currents and wind.

One issue with seaplanes is that they encounter difficulties in marina environment such as but not limited to creating wind disturbances that have a negative impact on boats in the marina. Additionally, running the propeller close to the dock and other vessels can be quite dangerous and as such many pilots will obtain momentum in a desired direction and then sail the seaplane into a dock or other area. This maneuver can lead a loss of directional control resulting in a diminished ability to perform the maneuver.

Accordingly, there is a need for a seaplane propulsion system that provides alternative directional control of a seaplane without utilizing the propeller.

SUMMARY OF THE INVENTION

It is the object of the present invention to provide a seaplane propulsion system that is configured to provide full directional movement of a seaplane wherein the present invention includes a first float member and a second float member operably secured to a seaplane.

Another object of the present invention is to provide a seaplane propulsion system operable to provide water maneuverability of a seaplane without utilization of the propeller wherein the first float member and the second float member include a first propulsion assembly and a second propulsion assembly.

A further object of the present invention is to provide a seaplane propulsion system that is configured to provide full directional movement of a seaplane wherein the first propulsion assembly and second propulsion assembly are similarly constructed.

Still another object of the present invention is to provide a seaplane propulsion system operable to provide water maneuverability of a seaplane without utilization of the propeller wherein the first propulsion assembly and second propulsion assembly are operable to provide both forward and rearward directional thrust.

An additional object of the present invention is to provide a seaplane propulsion system that is configured to provide full directional movement of a seaplane wherein the first propulsion assembly and second propulsion assembly are located at the rear end of the first float member and second float member.

Yet a further object of the present invention is to provide a seaplane propulsion system operable to provide water maneuverability of a seaplane without utilization of the propeller wherein the propulsion system includes nozzle housings extending rearward of the first and second float members.

Another object of the present invention is to provide a seaplane propulsion system that is configured to provide full directional movement of a seaplane wherein the propulsion system includes a movable directional member operable to direct water thrust.

Still another object of the present invention is to provide a seaplane propulsion system operable to provide water maneuverability of a seaplane without utilization of the propeller wherein the propulsion system utilizes impellers or similar element to provide water thrust.

An additional object of the present invention is to provide a seaplane propulsion system that is configured to provide full directional movement of a seaplane wherein the present invention is operated through a controller disposed in the aircraft cabin.

Still a further object of the present invention is to provide a seaplane propulsion system operable to provide water maneuverability of a seaplane without utilization of the propeller wherein the first propulsion assembly and second propulsion assembly are independently operated and capable of providing water thrust in opposite directions.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
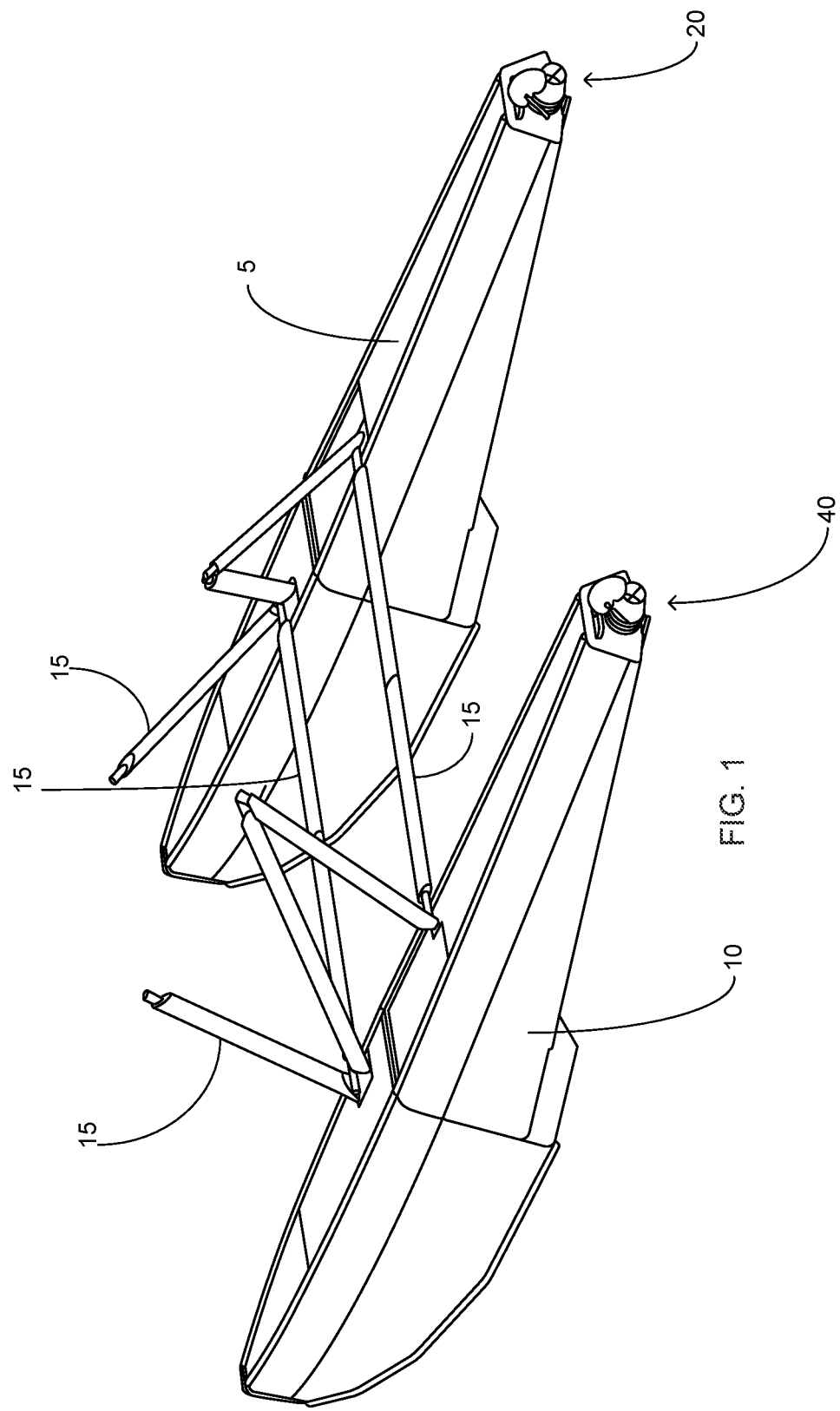
FIG. 1 is a perspective view of an embodiment of the present invention.
Figure 2:
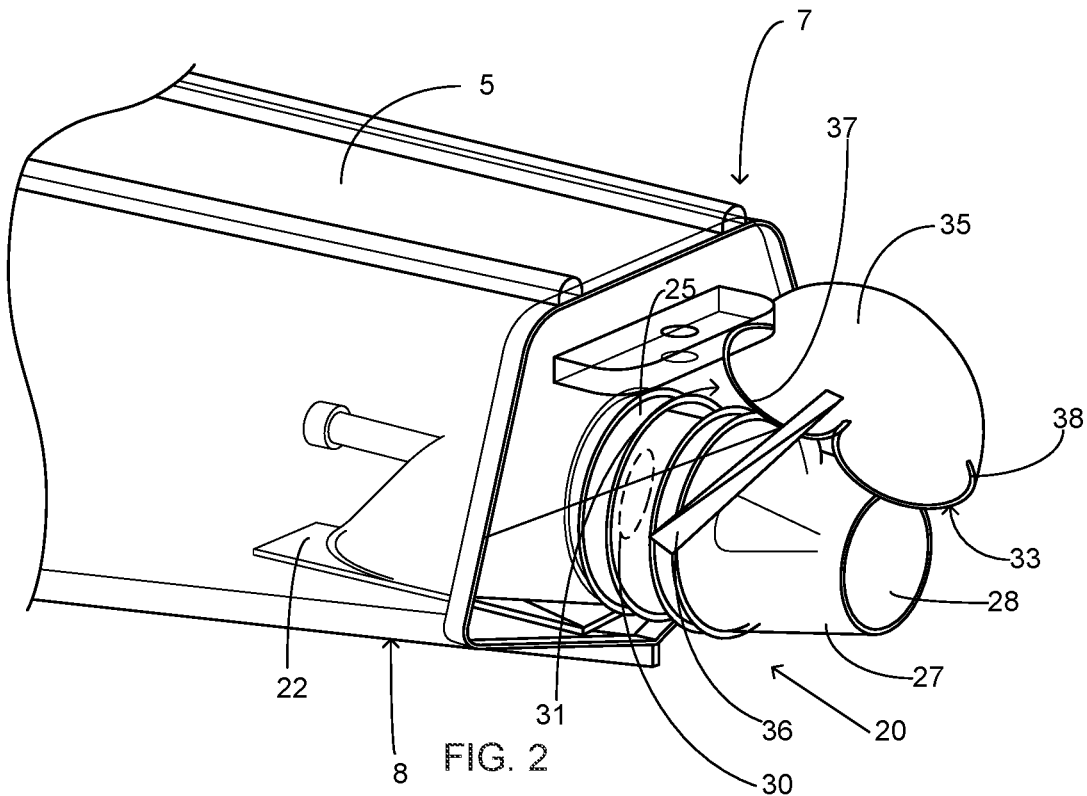
FIG. 2 is a detailed view of a propulsion assembly of the present invention with the rear directional tube member in a first position.
Figure 3:
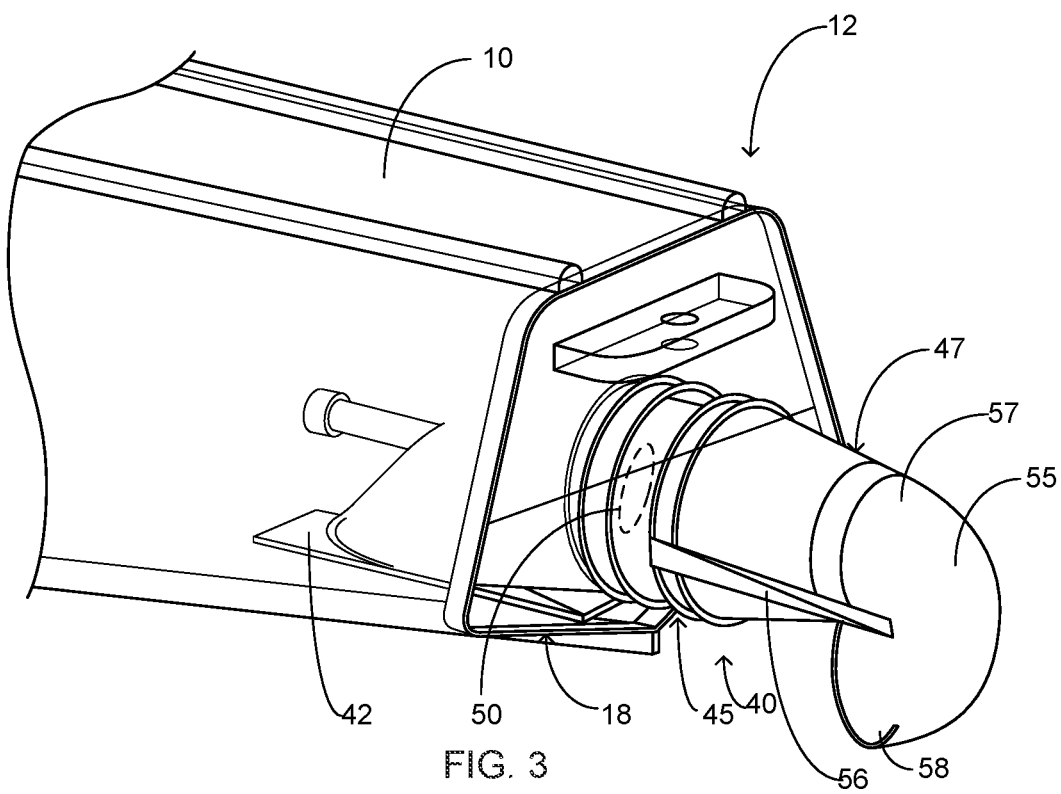
FIG. 3 is a detailed view of a propulsion assembly of the present invention with the rear directional tube member in a second position.
Figure 4:
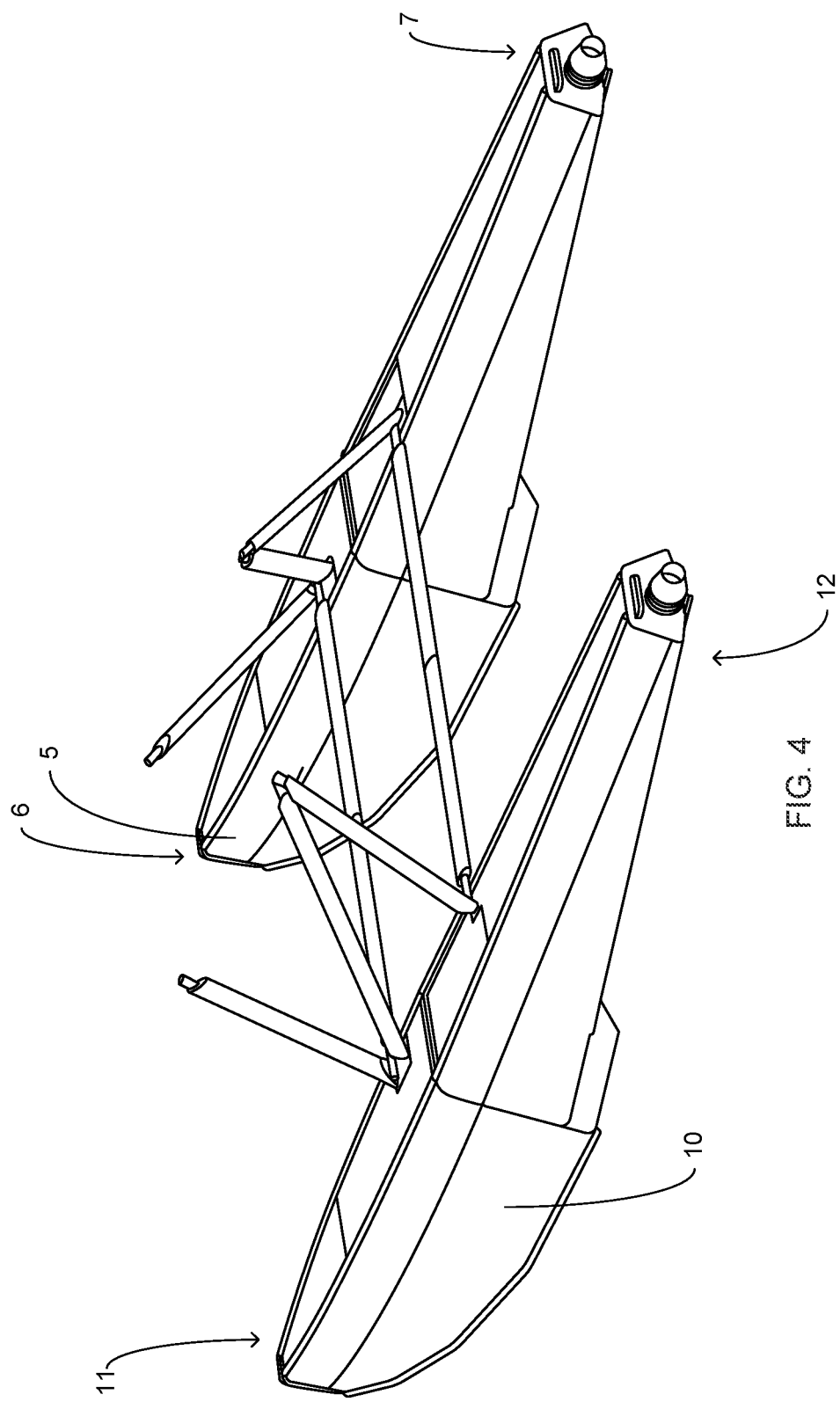
FIG. 4 is a perspective view of an embodiment of the present invention.

Referring now to the drawings submitted herewith, wherein various elements depicted therein are not necessarily drawn to scale and wherein through the views and figures like elements are referenced with identical reference numerals, there is illustrated a seaplane float propulsion system 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted as a part hereof, the seaplane float propulsion system 100 includes a first float member 5 and a second float member 10. The first float member 5 and second float member 10 are similarly constructed being manufactured from a suitable lightweight rigid material such as but not limited to metal. The first float member 5 and second float member 10 are substantially hollow in order to provide the desired flotation for a seaplane to which the seaplane float propulsion system 100 is operably coupled. The first float member 5 includes first end 6 and second end 7 wherein the first float member 5 tapers in shape from the first end 6 to the second end 7. The second float member 10 includes first end 11 and second end 12 and is shaped as the first float member 5. It should be understood within the scope of the present invention that the first float member 5 and second float member 10 could be constructed in alternate sizes and shapes in order to achieve the desired objective of providing floatation for alternate types of seaplanes. Additionally, it should be understood within the scope of the present invention that the present invention could be installed on a monohull seaplane in addition to the exemplary application illustrated herein. The first float member 5 and second float member 10 are operably coupled utilizing a plurality of support members 15. These support members 15 are also configured to be operably coupled to the body of the seaplane (not illustrated herein). It should be understood within the scope of the present invention that the support members 15 could be provided in alternate sizes and quantities in order to achieve the desired objective discussed herein.

The seaplane float propulsion system 100 includes a first propulsion assembly 20 and a second propulsion assembly 40. The first propulsion assembly 20 is mounted proximate the second end 7 of the first float member 5. The second propulsion assembly 40 is mounted at the second end 12 of the second float member 10. The first propulsion assembly 20 and second propulsion assembly 40 are independently operably so as to provide thrust in opposite directions as desired in order to achieve rotational maneuverability for a seaplane. The first propulsion assembly 20 and second propulsion assembly 40 are identically constructed and operated by a controller (not illustrated herein) that is disposed within the seaplane.

The first propulsion assembly 20 includes intake member 22 that is mounted in the bottom 8 of the first float member 5. The intake member 22 is mounted to be flush with the bottom 8 so as to inhibit any drag therefrom as the first float member 5 traverses through the water or when the seaplane is in the air. The intake member 22 is designed to allow water to egress therethrough and flow into the nozzle housing 25. It should be understood within the scope of the present invention that the intake member 22 could be provided in alternate sizes and designs in order to achieve the desired objective discussed herein. The nozzle housing 25 is operably mounted within the second end 7. The nozzle housing 25 is manufactured from a durable rigid material such as but not limited to metal. The nozzle housing 25 is annular in shape having a hollow interior volume. The nozzle housing 25 includes end member 27 wherein the end member 27 is tapered in shape in order to direct and accelerate water flow exiting the nozzle housing 25. Water flow egresses outward from the opening 28 formed in the end member 27. A water movement member 30 is operably mounted within the nozzle housing 25 and is configured to provide intake of water through the intake member 22 and direct the water flow outward through the opening 28. It should be understood within the scope of the present invention that the water movement member 30 could be a conventional impeller or other suitable element that is capable of achieving the desired objective as stated herein.

The first propulsion assembly 20 further includes a flow direction member 35. The flow direction member 35 is movably mounted to the nozzle housing 25 via arm member 36 and is configured to be moved between a first position and a second position. The flow direction member 35 is manufactured from a durable rigid material such as but not limited to metal. The flow direction member 35 is arcuate in shape having a circumferential angle of approximately one hundred and eighty degrees. The flow direction member 35 includes a first end 37 and a second end 38 wherein the flow direction member 35 is hollow intermediate the first end 37 and second end 38. Openings 31, 33 are present at first end 37 and second end 38 respectively so as to allow water to enter and exit the flow direction member 35. In its first position the flow direction member 35 is positioned above opening 28 so as to allow water to egress therefrom and avoid engagement therewith. In the second position of the flow direction member 35, the first end 37 is aligned with opening 28 wherein water egressing from opening 28 will enter the flow direction member 35 and egress from the second end 38 of the flow direction member 35. The second end 38 is directed towards the first float member 5 in the second position of the float direction member 35. In the second position of the flow direction member 35 the seaplane float propulsion system 100 can be utilized to provide rearward or rotational movement of a seaplane.

The second propulsion assembly 40 includes intake member 42 that is mounted in the bottom 18 of the second float member 10. The intake member 42 is mounted to be flush with the bottom 18 so as to inhibit any drag therefrom as the second float member 10 traverses through the water. The intake member 42 is designed to allow water to egress therethrough and flow into the nozzle housing 45. It should be understood within the scope of the present invention that the intake member 42 could be provided in alternate sizes and designs in order to achieve the desired objective discussed herein. The nozzle housing 45 is operably mounted within the second end 12. The nozzle housing 45 is manufactured from a durable rigid material such as but not limited to metal. The nozzle housing 45 is annular in shape having a hollow interior volume. The nozzle housing 45 includes end member 47 wherein the end member 47 is tapered in shape in order to direct and accelerate water flow exiting the nozzle housing 45. Water flow egresses outward from the end member 47. A water movement member 50 is operably mounted within the nozzle housing 45 and is configured to provide intake of water through the intake member 42 and direct the water flow outward through the nozzle housing 45. It should be understood within the scope of the present invention that the water movement member 50 could be a conventional impeller or other suitable element that is capable of achieving the desired objective as stated herein.

The second propulsion assembly 40 further includes a flow direction member 55. The flow direction member 55 is movably mounted to the nozzle housing 45 via arm member 56 and is configured to be moved between a first position and a second position. The flow direction member 55 is manufactured from a durable rigid material such as but not limited to metal. The flow direction member 55 is arcuate in shape having a circumferential angle of approximately one hundred and eighty degrees. The flow direction member 55 includes a first end 57 and a second end 58 wherein the flow direction member 55 is hollow intermediate the first end 57 and second end 58. In its first position the flow direction member 55 is positioned above end member 47 so as to allow water to egress therefrom and avoid engagement therewith. In the second position of the flow direction member 55, the first end 57 is aligned with end member 47 wherein water egressing therefrom will enter the flow direction member 55 and egress from the second end 58 of the flow direction member 55. The second end 58 is directed towards the second float member 10 in the second position thereof. In the second position of the flow direction member 55 the seaplane float propulsion system 100 can be utilized to provide rearward or rotational movement of a seaplane.

Figure 5:
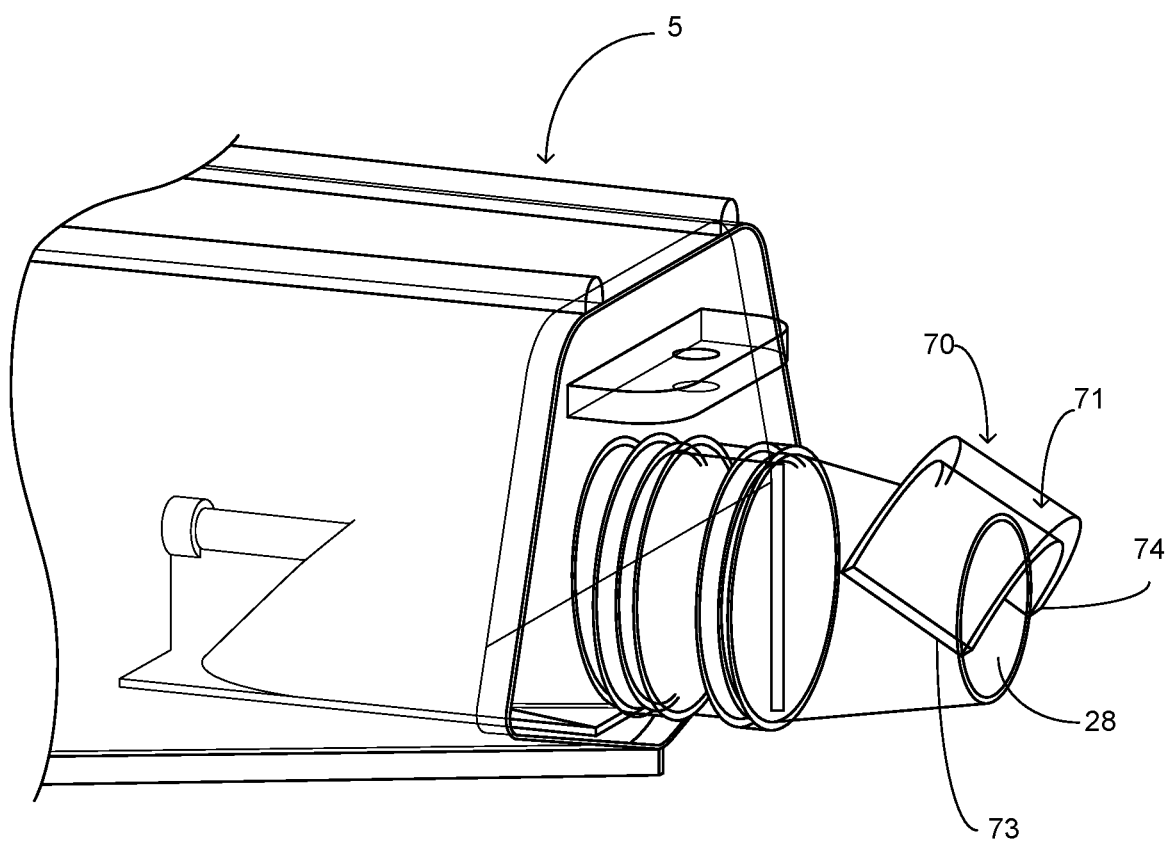
FIG. 5 is a detailed view of an embodiment of a propulsion assembly with a gate member.

Referring in particular to FIG. 5 submitted herewith, an alternative embodiment of the flow direction member 70 is illustrated therein. The flow direction member 70 is movably mounted to nozzle housing 25 via suitable mechanical techniques and is operable to re-direct and control water flow egressing from the end member 27. The flow direction member 70 is manufactured from a suitable rigid material such as but not limited to metal. The flow direction member 70 includes a body 71 that is arcuate in shape. The flow direction member 70 in its second position is positioned to cover the opening 28 wherein flow exiting therefrom would be directed outward from the lateral edges 73, 74 resulting in a water flow towards the first float member 5. The flow direction member 70 can be place in any position intermediate the first position and the second position so as to be utilized to either reduce forward speed or to direct water in a manner so as to reverse the direction of the first float member 5.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A seaplane float propulsion system that is operable to provide movement of a seaplane in water wherein the seaplane float propulsion system comprises:
   a first float member, said first float member having a first end and a second end, said first float member being hollow, said first float member being operably coupled to an aircraft;
   a second float member, said second float member having a first end and a second end, said second float member being operably coupled to the aircraft wherein the second float member is parallel to said first float member;
   a first propulsion assembly, said first propulsion assembly being mounted within said first float member, said first propulsion assembly being proximate said second end of said first float member, said first propulsion assembly configured to intake water thereinto and subsequently eject water therefrom;
   said first propulsion assembly comprising an intake member, said intake member being mounted in a bottom of said first flotation member, said intake member configured to permit water to enter thereinto;
   said first propulsion assembly further comprising a nozzle housing, said nozzle housing being operably coupled to said intake member, said nozzle housing being hollow allowing water to flow therethrough;
   said first propulsion assembly further comprising a water movement member, said water movement member being disposed within said nozzle housing, said water movement member operable to facilitate intake of water through said intake member and discharge the water through an end member of said nozzle housing;
   said first propulsion assembly further comprising a flow direction member, said flow direction member being movably coupled to said nozzle housing, said flow direction member being movable between and first position and a second position, said flow direction assembly configured to redirect water flow discharging from said end member in said second position
   a second propulsion assembly, said second propulsion assembly being mounted within said second float member, said second propulsion assembly being proximate said second end of said second float member, said second propulsion assembly configured to intake water thereinto and subsequently eject water therefrom; and wherein said first propulsion assembly and said second propulsion assembly are independently operable in order to provide water flow in opposite directions.

2. The seaplane float propulsion system that is operable to provide movement of the seaplane in water as recited in claim 1, wherein said second propulsion assembly includes an intake member, said intake member of said second propulsion assembly being mounted in a bottom of said second flotation member, said intake member of said second propulsion assembly configured to permit water to enter thereinto.

3. The seaplane float propulsion system that is operable to provide movement of the seaplane in water as recited in claim 2, wherein said second propulsion assembly further includes a nozzle housing, said nozzle housing of said second propulsion assembly being operably coupled to said intake member of said second propulsion assembly, said nozzle housing of said second propulsion assembly being hollow allowing water to flow therethrough.

4. The seaplane float propulsion system that is operable to provide movement of the seaplane in water as recited in claim 3, wherein said second propulsion assembly includes a water movement member, said water movement member of said second propulsion assembly being disposed within said nozzle housing of said second propulsion assembly, said water movement member of said second propulsion assembly operable to facilitate intake of water through said intake member of said second propulsion assembly and discharge the water through an end member of said nozzle housing of said second propulsion assembly.

5. The seaplane float propulsion system that is operable to provide movement of the seaplane in water as recited in claim 4, wherein said second propulsion assembly further includes a flow direction member, said flow direction member of said second propulsion assembly being movably coupled to said nozzle housing of said second propulsion assembly, said flow direction member of said second propulsion assembly being movable between and first position and a second position, said flow direction assembly of said second propulsion assembly configured to redirect water flow discharging from said end member of said second propulsion assembly in said second position.

6. The seaplane float propulsion system that is operable to provide movement of the seaplane in water as recited in claim 5, wherein said flow direction member of said second propulsion assembly includes a first end and a second end, said flow direction member being hollow between said first end and said second end thereof, said flow direction member being curved in shape so as to direct waterflow discharging therefrom towards said second float member when said flow direction member of said second propulsion assembly is in said second position.

7. The seaplane float propulsion system that is operable to provide movement of the seaplane in water as recited in claim 6, wherein said first propulsion assembly and said second propulsion assembly are independently operable.

8. The seaplane float propulsion system that is operable to provide movement of the seaplane in water as recited in claim 7, wherein said flow direction member of said first propulsion assembly includes a first end and a second end, said flow direction member of said first propulsion assembly being hollow between said first end and said second end thereof, said flow direction member of said first propulsion assembly being curved in shape so as to direct waterflow discharging therefrom towards said first float member when said flow direction member of said first propulsion assembly is in said second position.

9. A seaplane propulsion system operably coupled to float members of a seaplane so as to provide directional movement of the seaplane in the water wherein the seaplane propulsion system comprises:

a first propulsion assembly, said first propulsion assembly being mounted within one of said float members of the seaplane, said first propulsion assembly configured to intake water thereinto and subsequently eject water therefrom, said first propulsion assembly includes an intake member, said intake member configured to provide intake of water in which the seaplane is floating, said first propulsion assembly including a nozzle housing, said nozzle housing being operably coupled to said intake member, said nozzle housing being hollow allowing water to flow therethrough, said first propulsion assembly further including a water movement member, said water movement member being disposed within said nozzle housing, said water movement member operable to facilitate intake of water through said intake member and discharge the water through an end member of said nozzle housing, said end member being tapered in form, said first propulsion assembly further having a flow direction member, said flow direction member being movably coupled to said nozzle housing, said flow direction member being movable between and first position and a second position, said flow direction assembly configured to direct water flow discharging from said end member in said second position towards the float members;

a second propulsion assembly, said second propulsion assembly being mounted within one of said float members of the seaplane opposite that of the float member in which said first propulsion assembly is mounted, said second propulsion assembly configured to intake water thereinto and subsequently eject water therefrom, said second propulsion assembly further including an intake member, said intake member of said second propulsion assembly configured to provide intake of water in which the seaplane is floating, said second propulsion assembly including a nozzle housing, said nozzle housing of said second propulsion assembly being operably coupled to said intake member of said second propulsion assembly, said nozzle housing of said second propulsion assembly being hollow allowing water to flow therethrough, said second propulsion assembly further including a water movement member, said water movement member of said second propulsion assembly being disposed within said nozzle housing of said second propulsion assembly, said water movement member of said second propulsion assembly operable to facilitate intake of water through said intake member of said second propulsion assembly and discharge the water through an end member of said nozzle housing of said second propulsion assembly, said end member of said second propulsion assembly being tapered in form, said first propulsion assembly further having a flow direction member, said flow direction member of said second propulsion assembly being movably coupled to said nozzle housing, said flow direction member of said second propulsion assembly being movable between and first position and a second position, said flow direction assembly of said second propulsion assembly configured to direct water flow discharging from said end member of said second propulsion assembly in said second position towards the float members; and wherein the first propulsion assembly and second propulsion assembly are independently operable.

10. The seaplane propulsion system operably coupled to the float members of the seaplane as recited in claim 9, wherein the flow direction member of the first propulsion assembly and the flow direction member of the second propulsion assembly have a first end and a second end and further being hollow therebetween.

11. The seaplane propulsion system operably coupled to the float members of the seaplane as recited in claim 10, wherein the flow direction member of the first propulsion assembly and the flow direction member of the second propulsion assembly have a circumferential angle of one hundred and eighty degrees.

12. The seaplane propulsion system operably coupled to the float members of the seaplane as recited in claim 11, wherein in said second position the flow direction member of the first propulsion assembly and the flow direction member of the second propulsion assembly is aligned with and adjacent to an opening of said end member of said nozzle housing of said first propulsion assembly and said second propulsion assembly.

13. The seaplane propulsion system operably coupled to the float members of the seaplane as recited in claim 12, wherein in said first position the flow direction member of the first propulsion assembly and the flow direction member of the second propulsion assembly is above said nozzle housing of said first propulsion assembly and said second propulsion assembly.

\* \* \* \* \*